United States Patent [19]

Huggins

[11] 3,991,820

[45] Nov. 16, 1976

[54] RECUPERATOR STRUCTURE

[75] Inventor: Homer D. Huggins, Racine, Wis.

[73] Assignee: Modine Manufacturing Company, Racine, Wis.

[22] Filed: Dec. 18, 1975

[21] Appl. No.: 642,059

[52] U.S. Cl. .................................. 165/111; 55/269; 62/93
[51] Int. Cl.² .......................................... F28B 1/06
[58] Field of Search ........... 165/111, DIG. 2; 34/86; 62/92, 93; 55/267, 268, 269

[56] References Cited
UNITED STATES PATENTS 3,386,502   6/1968   Rostaing ......................... 165/111 X
3,792,572   2/1974   Turbin ............................... 165/111

Primary Examiner—Alan Cohan
Attorney, Agent, or Firm—Wegner, Stellman, McCord, Wiles & Wood

[57] ABSTRACT

A recuperator structure for recovering heat values from a moisture laden hot gas stream that uses a plurality of heat exchangers having separated sets of passages through each in heat exchange relationship with each other, means for directing the hot gas stream through a first set of passages and means for directing ambient air through a second set of the passages and to a space for transferring heat to the space, means for precooling the hot gas stream upstream of the heat exchangers to condense moisture from the hot gas stream, means including separate ducts for arranging the heat exchanger and corresponding precooling means in first and second separate banks, flow control means in each duct for directing the hot gas stream selectively through the separate ducts while maintaining the other duct dormant and means for directing a heating medium through the precool means in the dormant duct to melt any frost remaining on the dormant duct precool means.

9 Claims, 2 Drawing Figures

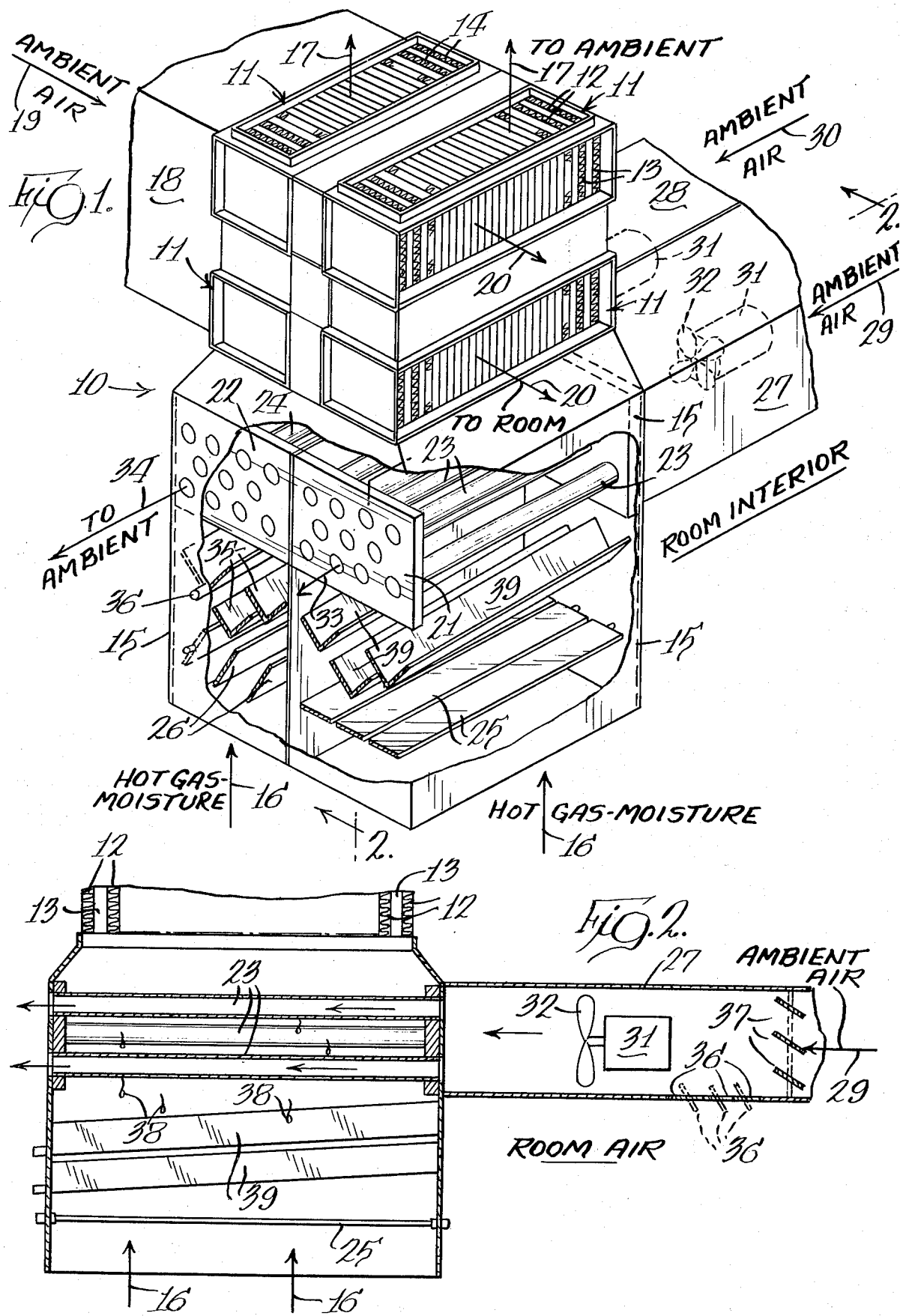

3,991,820

RECUPERATOR STRUCTURE

BACKGROUND OF THE INVENTION

In many installations particularly of an industrial nature there are produced gases that are hot and that contain moisture. Various means have been proposed in the past for recovering the heat from these waste gas streams and certain of these prior devices utilize the waste heat to heat a space such as a room or the interior of a building. In certain of these recuperator structures especially where ambient air is used for the air supply to the space problems are created in cold climates in cold seasons of the year with frost being deposited on the heat exchangers used in the recuperator structures. The apparatus of this invention provides improved means for recovering the heat values from a moisture laden hot gas stream and for using ambient air to absorb the heat and be heated thereby for supply to the space. The present invention also provides means for periodically defrosting the recuperator system so that the frost will not interfere with the gas flow through the structure of this invention.

BRIEF DESCRIPTION OF THE DRAWINGS

FIG. 1 is a perspective semi-schematic view partially broken away for clarity of illustration of a recuperator structure embodying the invention.

FIG. 2 is a fragmentary sectional view taken substantially along line 2—2 of FIG. 1.

DESCRIPTION OF THE PREFERRED EMBODIMENT

The recuperator structure 10 of this invention comprises a plurality of heat exchangers 11 here shown as four each having separated sets of passages 12 and 13 therethrough in heat exchange relationship with each other with each passage containing a heat exchange undulating fin 14. Heat exchangers of the same general type are disclosed in my copending application Ser. No. 595,623, filed July 14, 1975, and assigned to the assignee hereof.

A first set 12 of these passages is provided with means including a duct 15 for directing a moisture laden hot gas stream 16 through the first set of passages and to ambient as indicated by the arrow 17 and accompanying legend and the second set of passages 13 has means including a second duct 18 for directing ambient air 19 through the second passages and to a space such as a room or building interior to be heated as indicated by the arrows 20.

In addition, means are provided located in the first duct 15 for precooling the moisture laden hot gas stream 16 upstream of the heat exchangers 11 to condense moisture from this hot gas stream prior to the stream reaching the heat exchangers where such condensible moisture is present. In the illustrated embodiment this precooling means comprises first 21 and second 22 tube bundles with tube bundles being located in each of the ducts 15 so that each tube bundle comprises a bank of tubes 23 and 24.

Each of the ducts 15 has located therein flow control means illustrated by the substantially closed dampers 25 in the right-hand duct 15 and the open dampers 26 in the other duct 15. These dampers comprise flow control means for directing the hot gas stream 16 selectively through the separate ducts while maintaining the other duct dormant. Thus, as illustrated, the closed dampers 25 are in the dormant duct while the open dampers 26 are in the other and active duct. For illustrative purposes, two arrows 16 are shown in FIG. 1 from the two ducts because there will be a certain amount of gas flow even in the dormant duct.

The recuperator structure also includes a pair of third ducts 27 and 28 for conducting ambient air 29 and 30 through the precooling tubes 23 and 24, respectively, with each duct 27 and 28 including a motor 31 operated blower 32 for forcing the ambient air from the ambient through the ducts 27 and 28 and their respective tubes 23 and 24 in the two tube bundles and from there back to ambient as indicated by the arrows 33 and 34.

When the dampers 25 are in substantially closed position as illustrated the moisture laden hot gas stream 16 flows through the other of the pair of ducts 15 and over the surfaces of the corresponding tubes 24 in the corresponding tube bundle 22. The chilling of the hot gas causes condensate to deposit on the outer surfaces of the tubes 24 and it drops into receiving troughs 35 where it is conveyed through conduits 40 to the exterior of the recuperator structure 10.

When the cooling means as exemplified by the ambient air streams 29 and 30 are of sufficiently low temperature frost will tend to build up on the exterior of the tube bundles 21 and 22 that are in service at the time. In order to remove this frost so that it cannot build up to a gas flow interferring mass means are provided for directing a heating medium through the precooling means in the dormant duct to melt the frost therefrom. In the embodiment illustrated this means for directing a heating medium comprises side dampers 36 in each of the ducts 27 and 28 so that when they are opened to the dotted line position of FIG. 2 and the ambient air dampers 37 are moved to closed position as shown in dotted lines in this figure room air is drawn into the duct 27 and forced through the tubes 23 so that the frost is melted and drops therefrom as illustrated at 38 into the corresponding troughs 39 for flow to the exterior of the recuperator. The troughs 39 are of course similar to the other set of troughs 35 previously described.

In the illustrated embodiment the ambient cooling air 19 as well as the moisture laden hot gas 16 are each directed through a pair of the heat exchangers 11 in series. If it weren't for the precooling of the hot gas 16 in the tube bundles 21 or 22 frost would tend to build up when the ambient air was at subfreezing temperatures in the top heat exchanger 11 to a greater extent than in the lower heat exchanger. However, because of the precooling arrangement, any frost that is deposited is on the outer surfaces of the precooling tubes 23 or 24 where it can be easily melted and disposed of.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A recuperator structure for recovering heat values from a moisture laden hot gas stream, comprising: a plurality of heat exchangers having separated sets of passages therethrough in heat exchange relationship with each other, a first set of said passages having means for directing said gas stream therethrough and the second set of said passages having means for directing ambient air therethrough and to a space; means for precooling said moisture laden hot gas stream upstream of said heat exchangers to condense moisture from said hot gas stream; means for arranging said heat exchangers and corresponding precooling means in first and second separate banks each comprising a duct; flow control means in each said duct for directing said hot gas stream selectively through said separate ducts while maintaining said other said duct dormant; and means for directing a heating medium through the precool means in said dormant duct to melt any frost from said dormant duct precool means.

2. The structure of claim 1 wherein said precooling means comprises separate bundles of tubes and there are provided means for directing ambient air through said tubes, means for directing said hot gas over said tubes for condensing hot gas moisture on the outer surfaces of said tubes and drain troughs beneath said tubes for collecting the resulting said condensate.

3. The structure of claim 1 wherein said plurality of heat exchangers comprises a pair of heat exchangers in each of two of said separate banks and means for directing the flow through each said duct in series through a said pair of heat exchangers.

4. The structure of claim 1 wherein said precooling means comprises separate bundles of tubes with the tubes in each bundle arranged in parallel and there are provided means for directing a cooling medium through said tubes for chilling the same to a moisture condensing temperature whereby moisture from said hot gas stream condenses on the exterior of said tubes.

5. The structure of claim 4 wherein condensate disposal troughs are provided beneath said tubes to receive moisture by gravity flow from said tubes and conduct the moisture away from said ducts.

6. The structure of claim 4 wherein said precooling means comprises duct means with blower means for forcing ambient air through said tubes and back to ambient.

7. The structure of claim 6 wherein there are provided a pair of ambient air ducts in which is positioned a motorized blower and means for selectively opening and closing each of said ducts for selective flow through the tubes of a tube bundle while preventing substantial flow through the other said bundle which is thereby dormant.

8. The structure of claim 7 wherein means are provided for directing a heating medium through the ambient air duct leading to the dormant tube bundle for melting any frost previously deposited on said dormant tube bundle.

9. The structure of claim 8 wherein said heating medium comprises air from said space and with flow of the space air into the heating duct being selectively controlled by movable damper means.

* * * * *